United States Patent
Kim et al.

(10) Patent No.: US 8,665,401 B2
(45) Date of Patent: Mar. 4, 2014

(54) LIQUID CRYSTAL DISPLAY PANEL HAVING HYDROPHOBIC PLANARIZATION WITH HYDROPHILIC REGIONS AND FABRICATING METHOD AND APPARATUS THEREOF

(75) Inventors: Jeong Hyun Kim, Kyounggi-do (KR); Jae Hong Jun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 13/093,925

(22) Filed: Apr. 26, 2011

(65) Prior Publication Data
US 2011/0211147 A1    Sep. 1, 2011

Related U.S. Application Data

(62) Division of application No. 10/747,071, filed on Dec. 30, 2003, now Pat. No. 7,940,367.

(30) Foreign Application Priority Data

Jun. 19, 2003  (KR) ................ P2003-39640

(51) Int. Cl.
*G02F 1/1335*  (2006.01)
*G02F 1/1339*  (2006.01)
*G09G 3/36*  (2006.01)

(52) U.S. Cl.
USPC .............................. 349/106; 349/155; 345/88

(58) Field of Classification Search
USPC ..................... 349/106, 155; 345/88
See application file for complete search history.

(56) References Cited

U.S. PATENT DOCUMENTS

| | | | |
|---|---|---|---|
| 4,776,959 A * | 10/1988 | Kasai et al. | 210/490 |
| 5,877,263 A | 3/1999 | Patnaik et al. | |
| 6,271,907 B1 | 8/2001 | Masaki et al. | |
| 6,501,527 B1 | 12/2002 | Hirose et al. | |
| 6,602,382 B1 | 8/2003 | Matsuyama et al. | |
| 6,696,225 B1 | 2/2004 | Kanbe et al. | |
| 6,842,278 B1 * | 1/2005 | Sakamaki et al. | 359/296 |
| 6,891,590 B2 * | 5/2005 | Momose | 349/155 |
| 6,953,600 B2 | 10/2005 | Yokoyama et al. | |
| 6,975,379 B2 * | 12/2005 | Kim et al. | 349/155 |
| 2001/0004280 A1 | 6/2001 | Kim et al. | |
| 2002/0012095 A1 | 1/2002 | Lee et al. | |
| 2003/0002005 A1 | 1/2003 | Utsumi et al. | |
| 2003/0214620 A1 | 11/2003 | Kim et al. | |
| 2004/0125324 A1 | 7/2004 | Kim et al. | |

FOREIGN PATENT DOCUMENTS

| | | |
|---|---|---|
| JP | 2001-051280 | 2/2001 |
| JP | 2002-131524 | 5/2002 |
| JP | 2002-273209 | 9/2002 |
| KR | 2003-0037886 | 5/2003 |
| WO | WO 03/039875 | 5/2003 |

* cited by examiner

*Primary Examiner* — Hoan C Nguyen
(74) *Attorney, Agent, or Firm* — Morgan, Lewis & Bockius LLP

(57) ABSTRACT

The disclosed invention is with regard to a liquid crystal display panel including a substrate having a plurality of layers formed thereon, and having a first surface region and a second surface region on a surface of an uppermost layer of the plurality of layers, wherein the first and second surface regions having different surface characteristics in reaction to a particular liquid, and a spacer formed on the second surface region.

4 Claims, 15 Drawing Sheets

LIQUID CRYSTAL DISPLAY PANEL HAVING HYDROPHOBIC PLANARIZATION WITH HYDROPHILIC REGIONS AND FABRICATING METHOD AND APPARATUS THEREOF

This application is a divisional application of application Ser. No. 10/747,071, filed on Dec. 30, 2003, now U.S. Pat. No. 7,940,367, which claims the benefit of Korean Patent Application No. P2003-39640 filed in Korea on Jun. 19, 2003, both of which are hereby incorporated by reference.

BACKGROUND OF THE INVENTION

1. Field of the Invention

The present invention relates to a liquid crystal display panel, and more particularly to a liquid crystal display panel that has spacers at desirable locations.

2. Description of the Related Art

Generally, a liquid crystal display (LCD) controls the light transmittance of liquid crystal cells using an electric field to thereby display a picture on a liquid crystal display panel. To this end, the LCD includes a liquid crystal display panel having liquid crystal cells arranged in an active matrix form, and driving circuits for driving the liquid crystal panel. The liquid crystal display panel is provided with pixel electrodes and a reference electrode, i.e. common electrode, to supply the electric field to each one of the liquid crystal cells. Usually, while each one of the liquid crystal cells on a lower substrate have an individual pixel electrode, the common electrode is formed as an integrated electrode for all of the liquid crystal cells across the entire surface of an upper substrate. Each pixel electrode is connected with a thin film transistor (TFT) that is used for a switching element. The pixel electrode together with the common electrode drives the liquid crystal cell in response to data signals supplied via the TFT.

Figure 1:
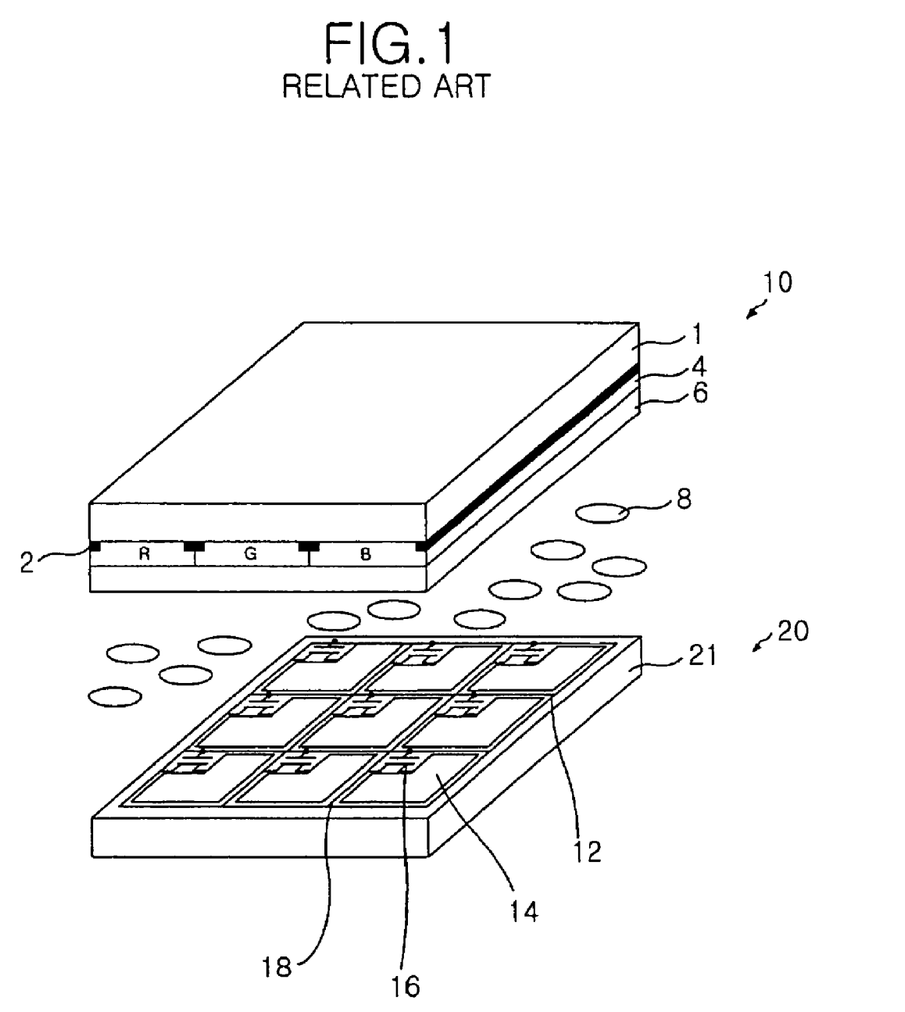
FIG. 1 is a perspective view showing the schematic structure of a related art liquid crystal display panel.

FIG. 1 illustrates a simplified structure of a related art liquid crystal display panel. As shown in FIG. 1, a typical liquid crystal display panel includes coupled upper and lower array substrates 10 and 20, and liquid crystal material 8 between the upper and the lower array substrates 10 and 20. The liquid crystal material 8 rotates in response to an electric field supplied to thereby regulate the transmittance of incident light coming through the lower array substrate 20.

The upper array substrate 10 includes a color filter 4 and a common electrode 6 formed on the rear surface of the upper substrate 1. The color filter 4, where red (R), green (G), and blue (B) colored filter layers arranged in the form of stripe make it possible to display colors by selectively passing the light through these colored filters. A black matrix 2 is placed between the adjacent colored filters 4, and prevents the degradation of the contrast ratio by absorbing the light from the adjacent cells.

The lower array substrate 20 includes: a data line 18 and gate line 12 that are crossed and are insulated by a gate insulating layer formed on the entire surface of the lower substrate 21; a TFT 16 placed adjacent the crossing of the data and gate lines 18 and 12; and a pixel electrode 14 contacting the TFT 16. In response to gate signals from the gate line 12, the TFT 16 selectively supplies the pixel electrode 14 with data signals from the data line 18. The TFT 16 is composed of: a gate electrode connected to the gate line 12; a source electrode connected to the data line 18; and a drain electrode connected to the pixel electrode 14.

The pixel electrode 14 is made from transparent conductive material having high light transmittance, and is placed within the cell region defined by the data line 18 and gate line 12. Data signals supplied to the pixel electrode 14 via the drain electrode generate electric potential difference between the pixel and common electrodes 14 and 6. Under the influence of this electric potential difference, the liquid crystals residing between the upper and lower substrates 1 and 21 rotate due to the dielectric anisotropy thereof. Hence, the light supplied from a light source under the lower substrate 21 passes through the liquid crystals toward the upper substrate 1.

Figure 2A:
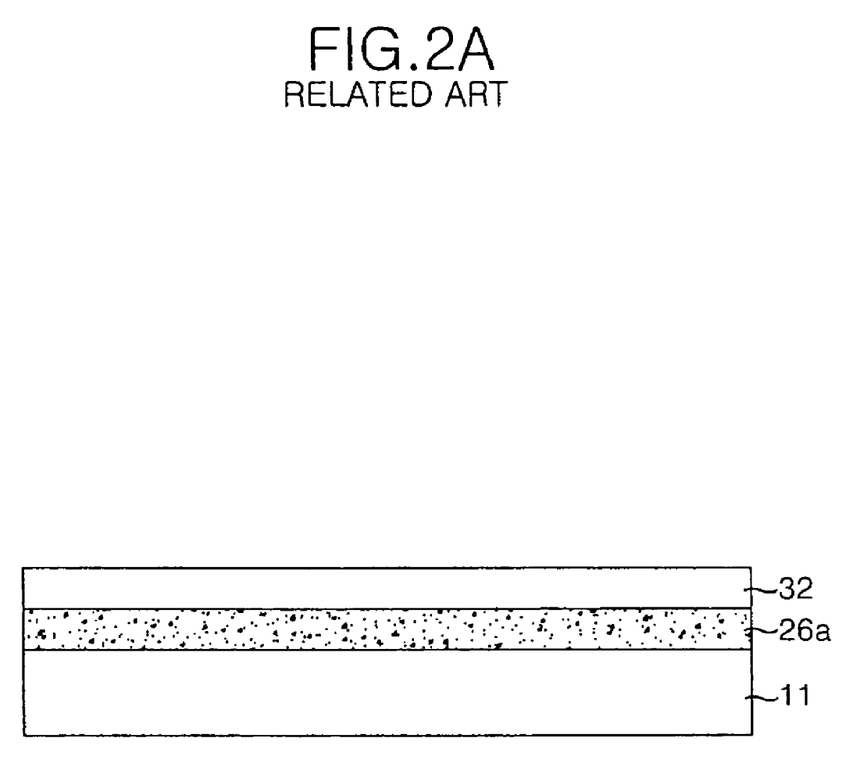
FIGS. 2a to 2d are sectional views representing a fabricating process for a pattern spacer of FIG. 1.

The cell gap between these upper and lower array substrates 10 and 20 is maintained by spacers, which are made through a manufacturing process illustrated in FIGS. 2a to 2d. As shown in FIG. 2a, mixed material of solvent, binder, monomer, and photo-initiator is printed onto a substrate 11. The mixed material is dried so as to evaporate the solvent such that a spacer material 26a is formed. The substrate 11 is either a lower substrate having TFTs and pixel electrodes installed thereon or an upper substrate having color filters installed thereon.

Figure 2B:
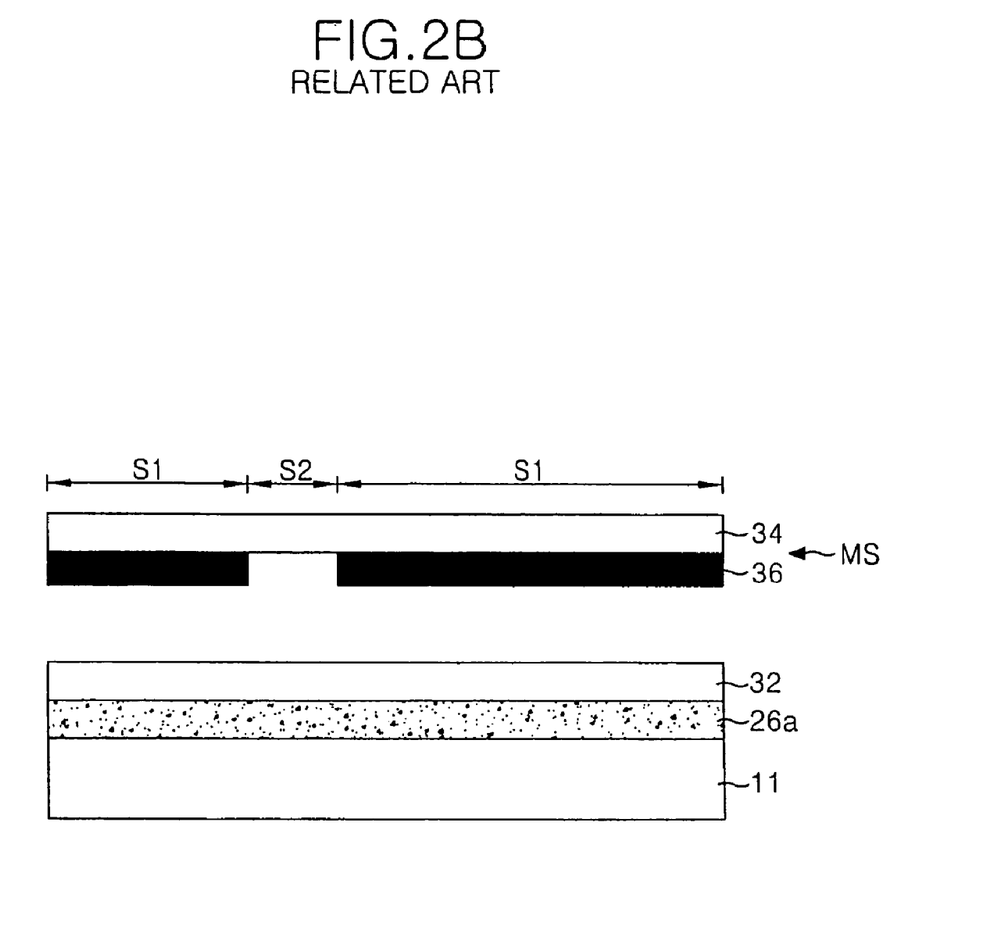
Figure 2C:
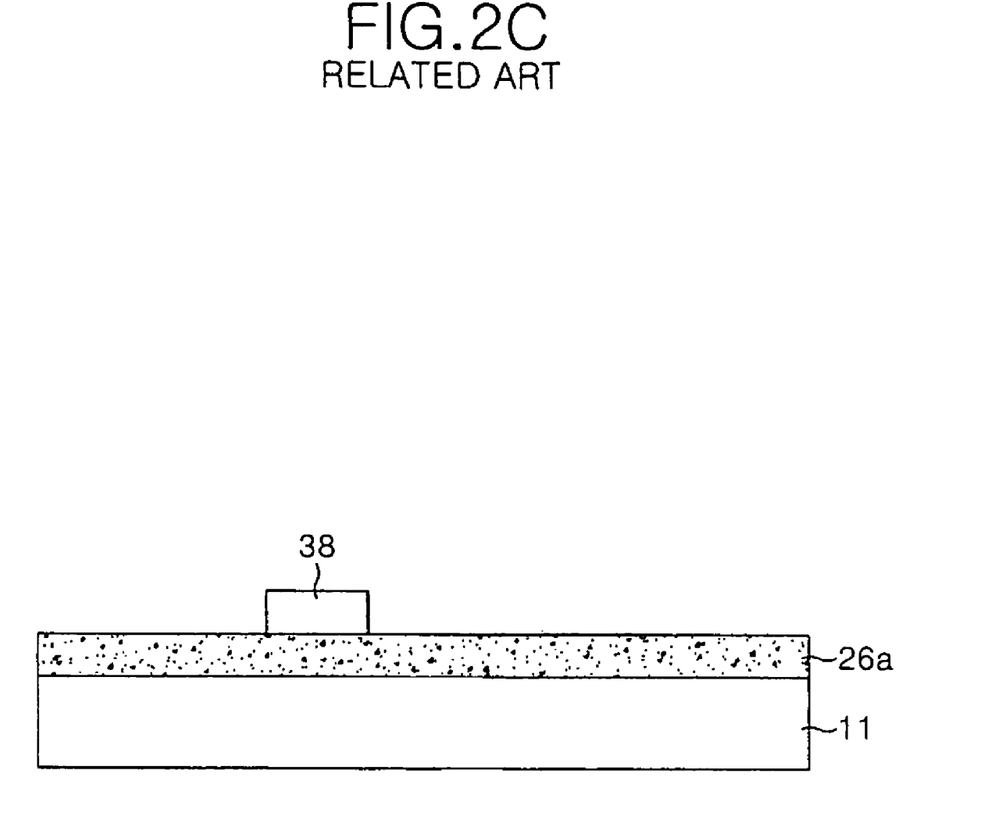
Figure 2D:
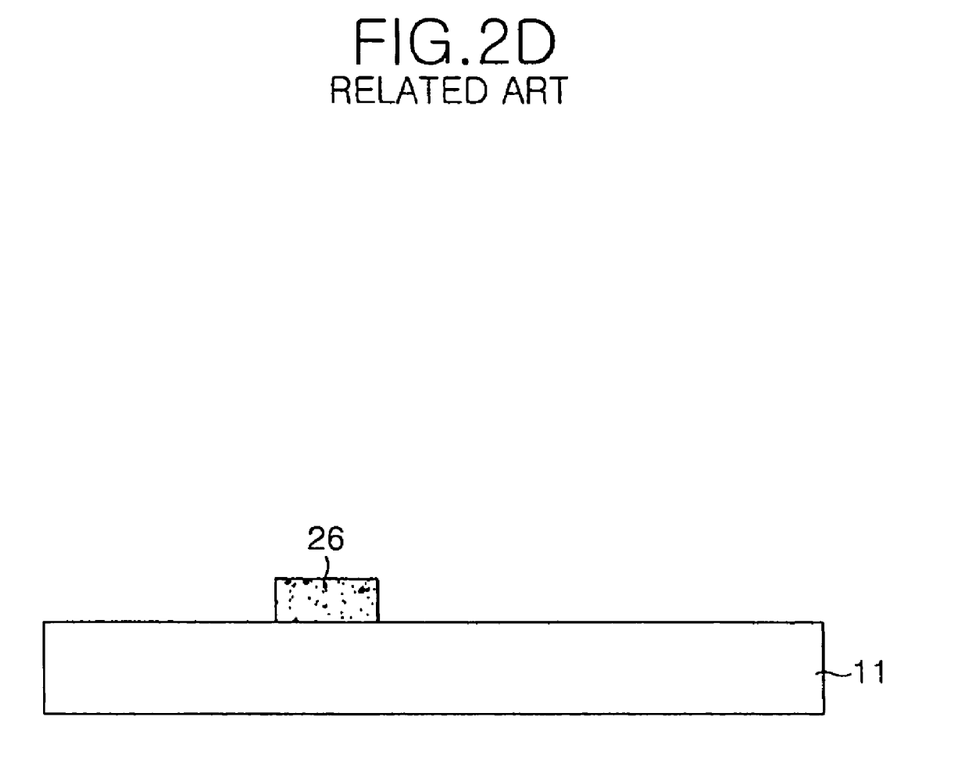

A photoresist 32 is coated on the substrate 11 having the spacer material 26a formed thereon. Then, a photomask MS is aligned, as shown in FIG. 2b. The photomask MS includes a mask substrate 34. A shielding layer 36 is formed on the mask substrate 34 so as to overlap with a shielding part S1. The transparent mask substrate 34 of the photomask MS is exposed at the exposure part S2. By carrying out the exposure process to selectively irradiate ultraviolet rays onto the photoresist 32 using the photomask MS and the development process to develop the exposed photoresist, a photoresist pattern 38 is formed, as shown in FIG. 2c. The spacer material 26a is patterned through an etching process using the photoresist pattern 38 as a mask, and consequently, a pattern spacer 26 having designated height is formed, as shown in FIG. 2d.

The pattern spacer 26 of the related art LCD occupies only about 2% of the area of the substrate 11. More than 95% of the spacer material 26a that was been printed on the entire surface of the substrate 11 to form the pattern spacer 26 is removed during the subsequent processes of exposure, development, and etching. Thus, a lot of spacer material is wasted, which increases the costs of material and fabrication. Further, the additional mask process for forming the pattern spacer 26 including sub-processes, such as printing, exposure, development, and etching, leads to the problem of making the fabricating process even more complex.

Figure 3A:
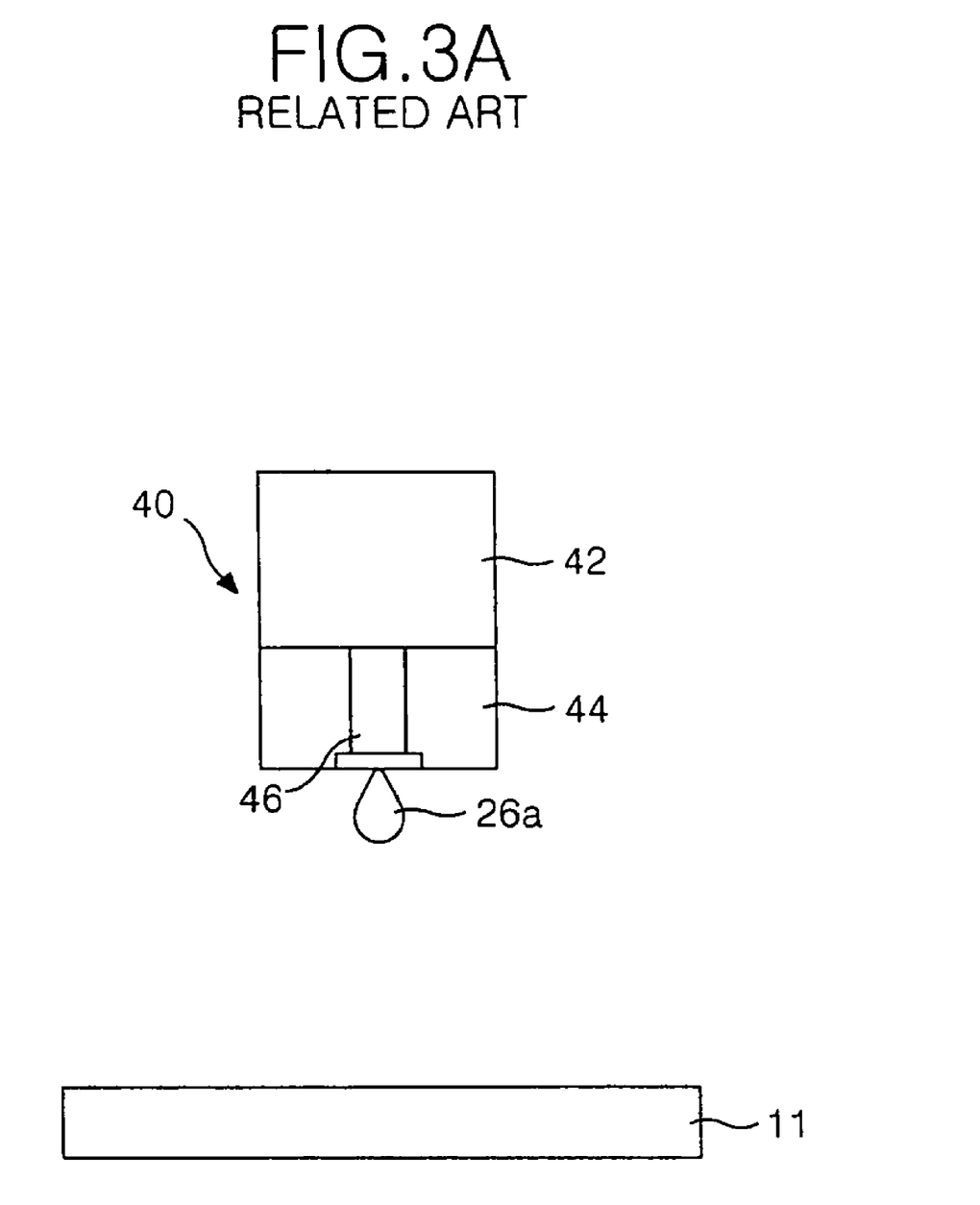
FIGS. 3a to 3c depict the process for manufacturing the spacer using a related art ink-jet device.
Figure 3B:
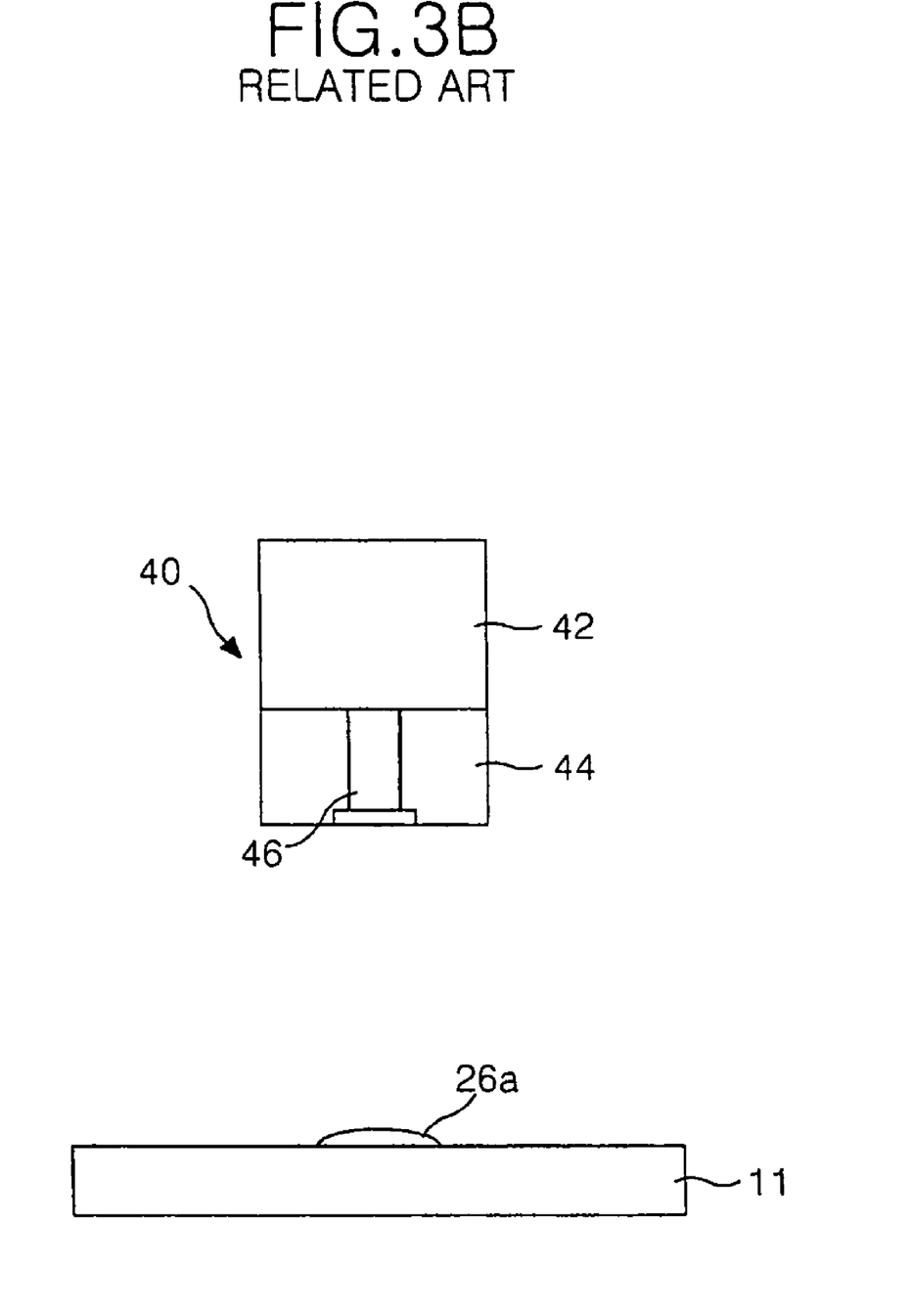

In order to solve these problems, a fabricating method for the spacer using an ink-jet device has been suggested as shown in FIGS. 3a to 3c. First, as shown in FIG. 3a, an ink-jet device 40 is aligned so as to overlap with the location where the spacer is to be formed on the substrate 11. Here, the substrate 11 is either a lower substrate 21 having TFTs 16 and pixel electrodes 14 installed thereon or an upper substrate 1 having color filters 4 installed thereon. Then, the spacer material 26a is jetted onto the substrate 11 from the ink-jet device 40. In other words, when an external voltage is supplied to a piezoelectric element of the ink-jet head, physical pressure is generated. This physical pressure causes the conduit 44 connecting the tank 42 containing the spacer material 26a with the nozzle 46 to contract and relax repeatedly, and thereby the spacer material 26a is jetted to the substrate 11 through the nozzle 46, as shown in FIG. 3B.

Figure 3C:
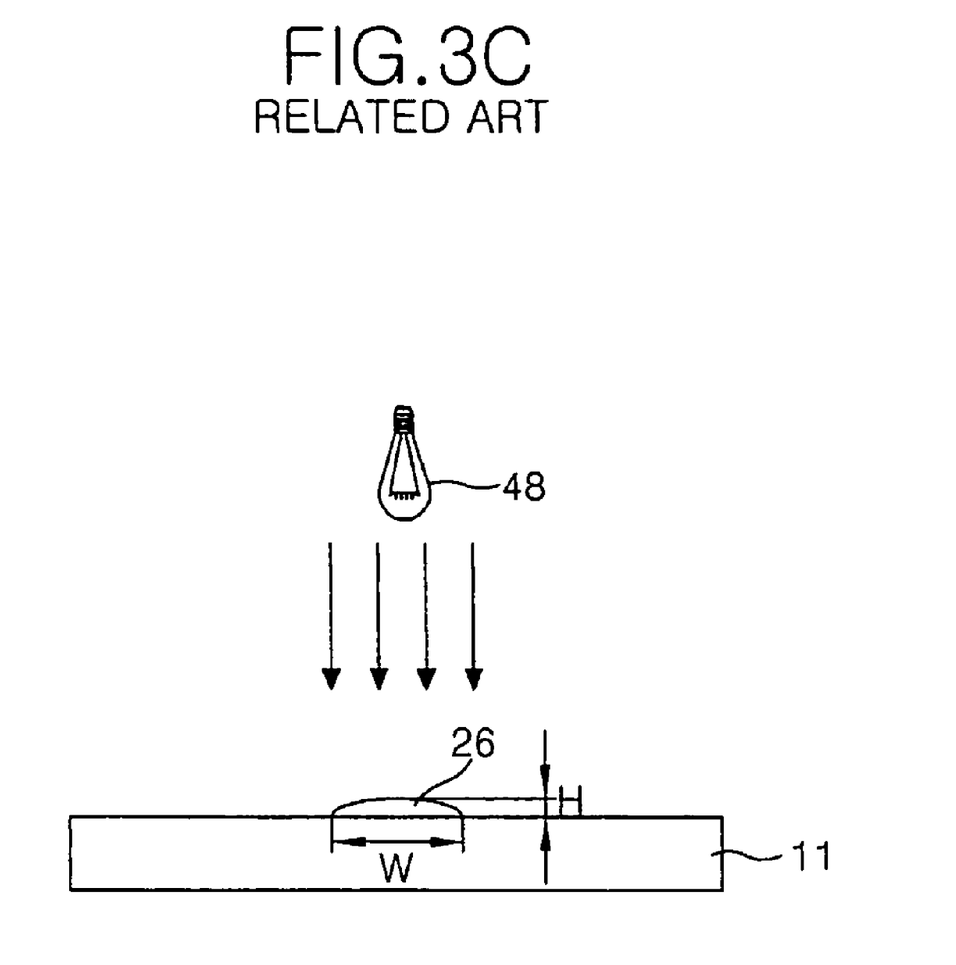

The spacer 26 formed by the spacer material jetted through the nozzle 46 of ink-jet device thereafter undergoes an exposure to the ultraviolet ray radiated from a light source 48 or a firing process as shown in FIG. 3c, and then cures to have a width W and height H.

During the formation of the spacer using the related art ink-jet device, the spacer material 26a of low viscosity experiences the gravity while being jetted to the substrate 11. Due to the effect of gravity, upon arriving at the substrate 11 the spacer material 26a spreads out too widely and results in an undesirably small ratio of height H to width W. This leads to the problem of the spacer 26 being formed to overlap with the black matrix 2 so as to encroach into areas that are not overlapped with the black matrix 2, such as the display area, and appears as a stain on the display area.

SUMMARY OF THE INVENTION

Accordingly, the present invention is directed to a liquid crystal display panel that substantially obviates one or more of the problems due to limitations and disadvantages of the related art.

An object of the present invention is to provide a liquid crystal display panel and a fabricating method and an apparatus thereof that reduce the amount of material used in forming spacers at desired locations.

Another object of the present invention is to provide a liquid crystal display panel and a fabricating method and an apparatus thereof that reduce the number of masks used in forming spacers at desired locations.

Another object of the present invention is to provide a liquid crystal display panel and a fabricating method and an apparatus thereof that consistently forms spacers of an adequate size at desired locations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a liquid crystal display panel including a substrate having a plurality of layers formed thereon, and having a first surface region and a second surface region on a surface of an uppermost layer of the plurality of layers, wherein the first and second surface regions having different surface characteristics in reaction to a particular liquid, and a spacer formed on the second surface region.

In another aspect, a method of fabricating a liquid crystal display panel includes: forming a plurality of layers on a substrate; forming a first surface region by applying a first surface process to a surface of an uppermost layer of the plurality of layers formed on the substrate; forming a second surface region having different surface characteristic in reaction to a particular liquid than the first surface region by applying a second surface process to a portion of the surface of the uppermost layer of the plurality of layers formed on the substrate; and forming a spacer using an ink-jet method.

In yet another aspect, an apparatus for fabricating a liquid crystal display panel includes: a first surface processing part for forming a first surface region by applying a first surface process to an uppermost layer of a plurality of layers formed on a substrate; and a spacer jetting part for forming a second surface region within the first surface region by applying a second surface process to a designated portion of the first surface region and for jetting spacer material onto the second surface region, wherein the second surface process makes the second surface region different from the first surface region in that the second surface region has different surface characteristics in reaction to a particular liquid than the first surface region.

It is to be understood that both the foregoing general description and the following detailed description are exemplary and explanatory and are intended to provide further explanation of the invention as claimed.

BRIEF DESCRIPTION OF THE DRAWINGS

These objects and other advantages of the invention will be apparent from the following detailed description of the embodiments of the present invention with reference to the accompanying drawings.

DETAILED DESCRIPTION OF THE PREFERRED EMBODIMENTS

Figure 4:
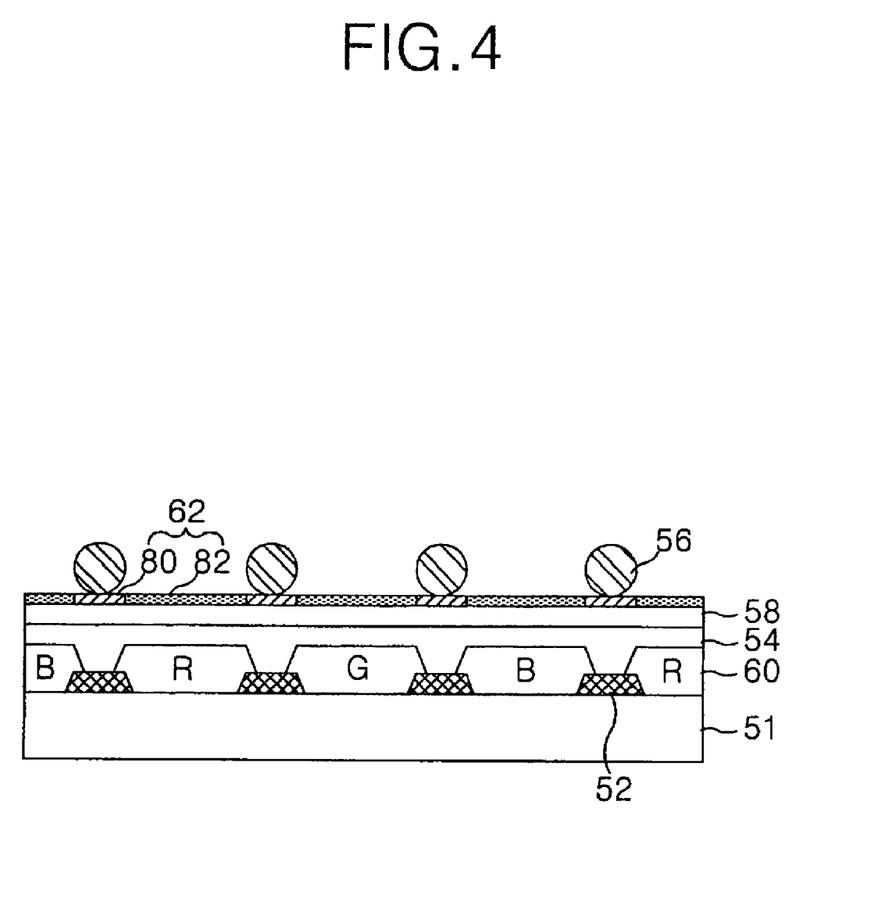
FIG. 4 is a cross sectional view illustrating the upper substrate of a liquid crystal display panel according to an embodiment of the present invention.

Reference will now be made in detail to the preferred embodiments of the present invention, examples of which are illustrated in the accompanying drawings FIG. 4 is a cross sectional view illustrating a liquid crystal display of vertical electric field mode panel according to an embodiment of the present invention. As shown in FIG. 4, the liquid crystal display panel of vertical electric field mode includes a black matrix 52, a color filter 60, a planarization layer 54, a common electrode 58, and a spacer 56, which are sequentially formed on an upper substrate 51.

The black matrix 52 partitions the upper substrate 51 into a plurality of cell regions in which the color filters 60 are to be formed, and plays a role of preventing the interference of light between adjacent cells. This black matrix 52 is formed so as to overlap areas of a lower array substrate (not shown) that does not include the pixel electrode, such as the areas having TFTs, gate lines, and data lines:

The color filter 60 is formed in the cell region defined by the black matrix 52. The color filter 60 is formed using separate red R, green G, and blue B filters to realize red, green, and blue colors. A planarization layer 54 is made of organic insulating material and planarizes the upper substrate 51 having the color filter 60 installed thereon. A flat common electrode 58 is formed on the planarization layer 54. A reference voltage for driving the liquid crystal is applied to the common electrode 58. The common electrode 58 is made from transparent conductive material, such as ITO, $In_2O_3$ compound, ZnO compound, $In_2O_3$—ZnO, and PEDOT.

A uniform electric field is applied to the liquid crystal through the common electrode 58 planarized by the planarization layer 54. The liquid crystal is driven by the vertical electric field formed between the common electrode 58 and the pixel electrode installed on the lower substrate. The surface 62 of the common electrode 58 is divided into a hydrophilic region 80 and a hydrophobic region 82. The hydrophilic region 80 is formed so as to overlap with the black matrix 52, and the hydrophobic region 82 is formed on the rest of the common electrode 58, such as the region of the common electrode 58 that do not overlap the black matrix 52. Here, the hydrophilic region 80 can be a polygonal shape or a circular, and the length of diameter or diagonal thereof is in the range of about 10~70 microns (μm).

The spacer 56 maintains the cell gap between the upper substrate 51 and the lower substrate. The spacer 56 is formed on the upper substrate 51 using an ink-jet method so as to overlap with at least one of a gate line, a data line, and a TFT. This spacer 56 is formed on the hydrophilic region 80 of the common electrode 58 or the planarization layer 54, and the shape thereof can be either a circle or an oval.

Figure 5:
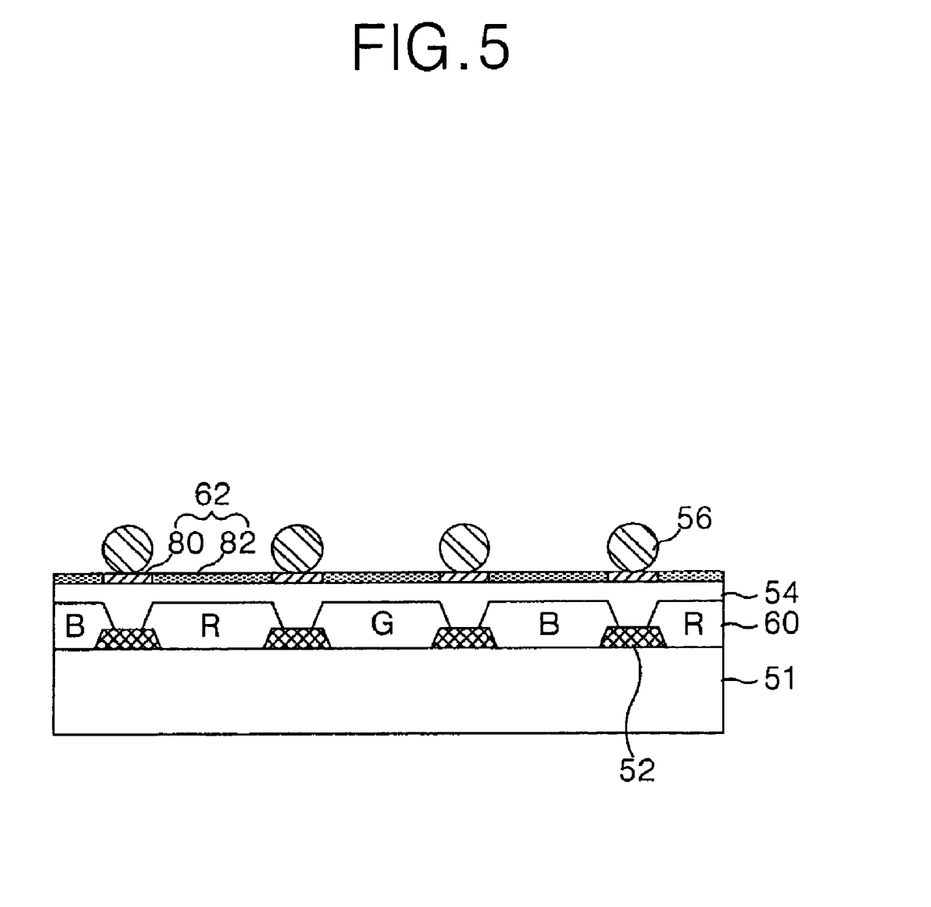
FIG. 5 is a cross sectional view illustrating the upper substrate of a liquid crystal display panel according to another embodiment of the present invention.

FIG. 5 is a cross sectional view illustrating the upper array substrate of a liquid crystal display panel of the horizontal electric field mode according to the second embodiment of the present invention. As shown in FIG. 5, the liquid crystal display panel adopting the horizontal electric field according to the present invention has constituent parts identical to that using the vertical electric field of FIG. 4, except the common electrode for driving the liquid crystal using the horizontal electric field is installed on the lower substrate. Hence, in the liquid crystal display panel of the horizontal electric field according to embodiments of the present invention, the spacer 56 is formed on the uppermost layer, the planarization layer 54.

The surface 62 of the planarization layer 54 is divided into a hydrophilic region 80, which overlaps the black matrix 52, and a hydrophobic region 82, which does not overlap the black matrix 52. The hydrophilic region 80 can be either a polygonal shape or a circular shape, and the length of diameter or diagonal thereof is in the range of about 10~70 microns (μm). A spacer 56, made of a hydrophilic material, is formed on the hydrophilic region 80 of the planarization layer 54, and maintains the cell gap between the upper substrate 51 and the lower substrate.

Figure 6A:
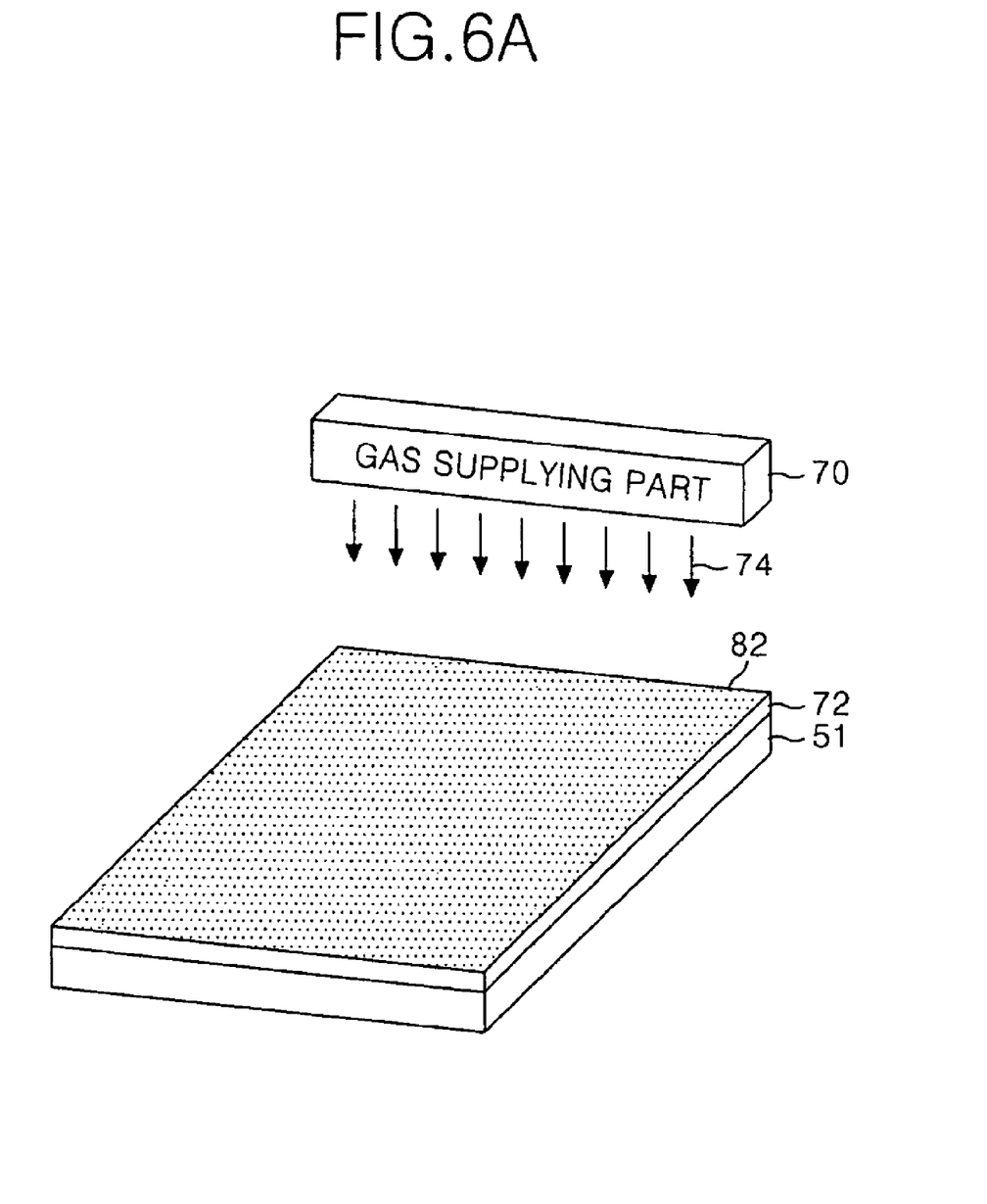
FIGS. 6a to 6d are plane views representing steps of a manufacturing process for an upper plate of the liquid crystal display panel of FIGS. 4 and 5.

FIGS. 6a to 6d are perspective views representing the manufacturing process for an upper plate of the liquid crystal display panel according to the first and the second embodiments of the present invention. As shown in FIG. 6a, a first surface process is applied to the uppermost layer 72 of several layers formed on the upper substrate 51. The uppermost layer 72 is the common electrode in the case of the liquid crystal display panel of the vertical electric field type, as shown in FIG. 4. Alternatively, the uppermost layer 72 is the planarization layer in the case of the crystal display panel of the horizontal electric field mode, as shown in FIG. 5.

More specifically, after the upper substrate 51 is placed in a vacuum chamber, a hydrophobic mixed gas 74 flows into the vacuum chamber through a gas supplying part 70. Here, a gas of fluorine compound such as $CF_4$ or $SF_6$ is used for the hydrophobic mixed gas. Afterwards, the fluorine compound gas is dissolved into plasma, and then the dissolved fluorine is deposited on the uppermost layer 72, the common electrode or the planarization layer. Thus, the entire surface of the uppermost layer 72 becomes the hydrophobic region, which completes the first surface process to the uppermost layer 72. The first surface process may be carried out using a normal atmospheric pressure method rather than in a vacuum chamber.

Figure 6B:
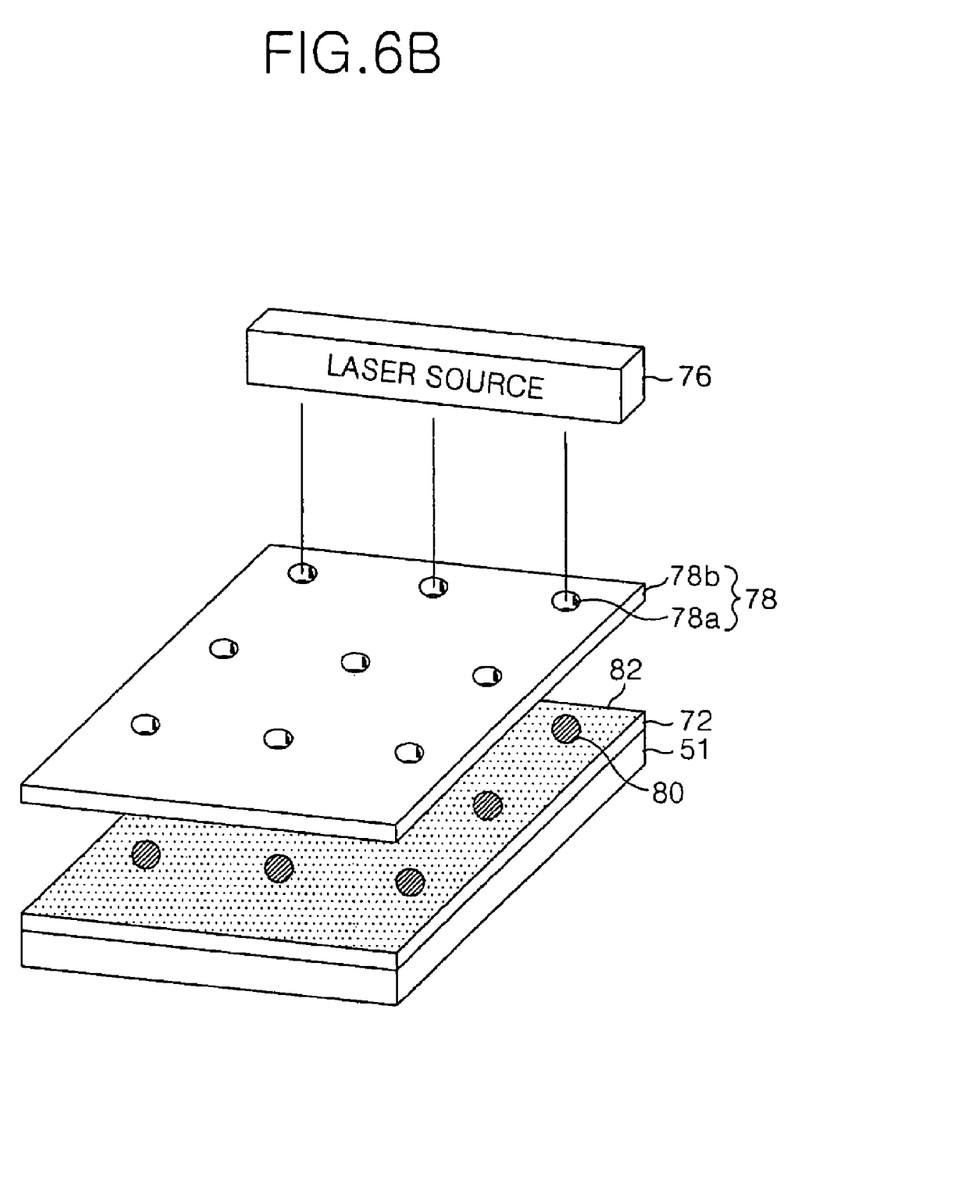

As shown in FIG. 6b, a second surface process is applied to a designated portion of the uppermost layer 72 which has already been subjected to the first surface process. More specifically, a mask 78 and a laser source 76 are aligned above the first surface processed uppermost layer 72. Here, the mask 78 has a transmission part 78a that overlaps with the black matrix (not shown) formed on the upper substrate 51, and a shielding part 78b that covers the other regions, which are not overlapped by the black matrix.

A laser beam of relatively short wavelength is generated from the laser source 76 that passes through the transmission part 78a of the mask 78. The wavelength of the laser beam is in the range of about 10~390 nanometers. The exposed portion of the first surface processed uppermost layer 72 becomes a hydrophilic region 80. In other words, the hydrophobic portion of the surface of the uppermost layer 72 that overlaps with the black matrix is exposed to the laser beam, and becomes the hydrophilic region 80, which completes the second surface process.

Figure 6C:
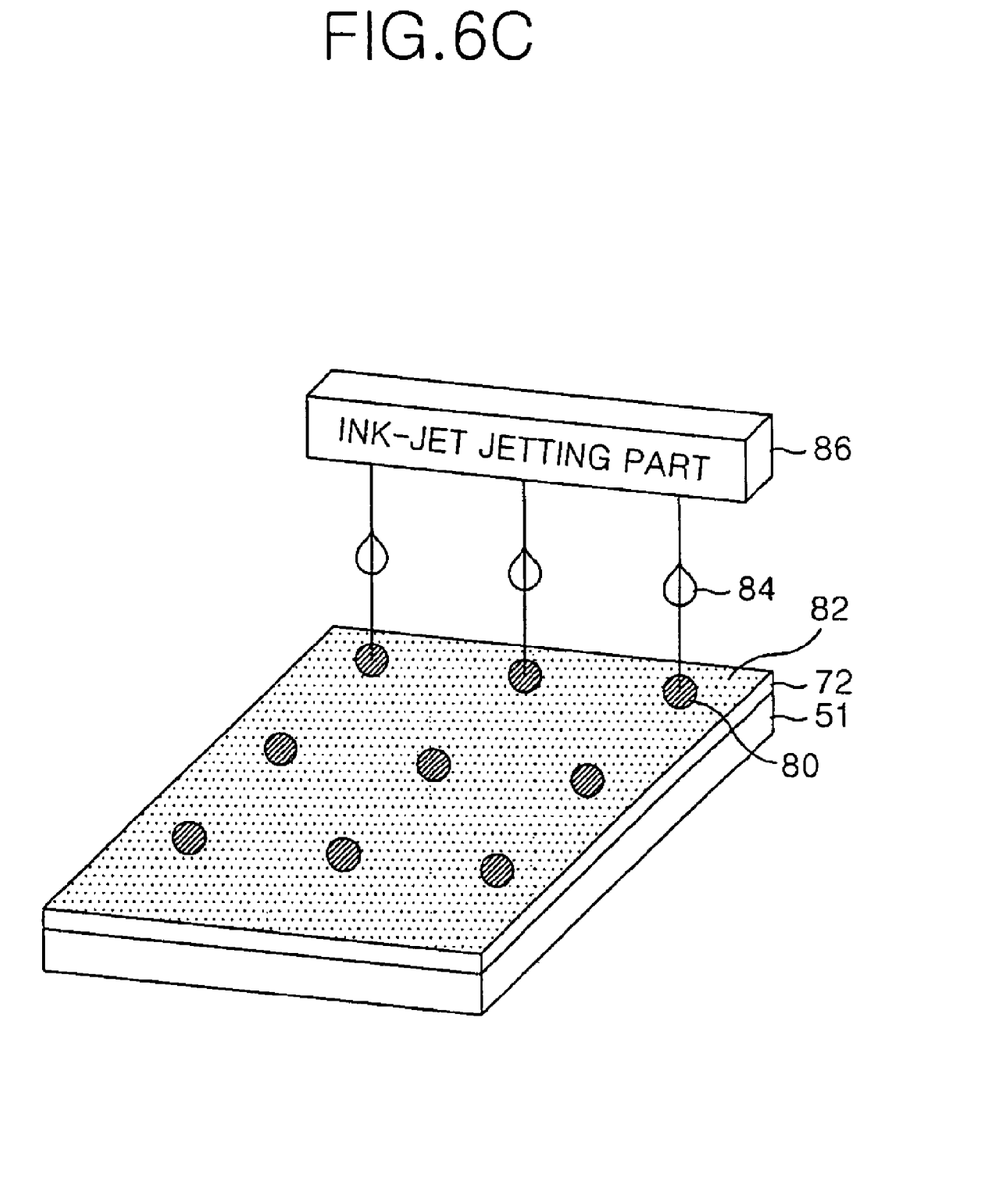
Figure 6D:
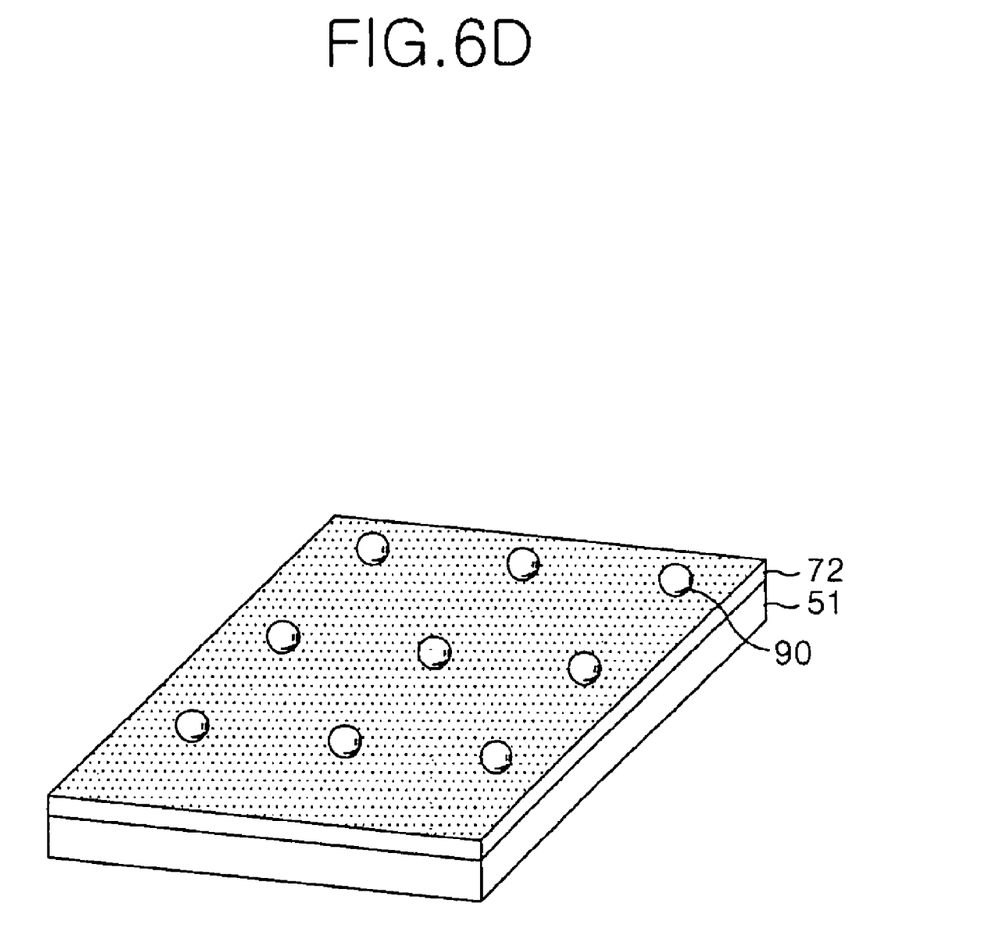

As shown in FIG. 6c, an ink-jet jetting part 86 is aligned above the second surface processed uppermost layer 72. The ink-jet jetting part 86 jets hydrophilic spacer material 84 onto the uppermost layer 72. In this case, the hydrophilic spacer material 84 has higher affinity with the hydrophilic region 80 than with the hydrophobic region 82 of the surface of the uppermost layer 72, which causes the hydrophilic spacer material 84 to stay within the hydrophilic region 80. Also, the surface tension between the hydrophobic region 82 and hydrophilic spacer material 84 causes some of the hydrophilic spacer material 84 that may have jetted onto the hydrophobic region 82 to move toward the hydrophilic region 80. Afterwards, the spacer material within the hydrophilic region 80 is hardened by an ultraviolet ray or a heater, then the spacer 90 with designated height is formed as shown in FIG. 6d.

Figure 7:
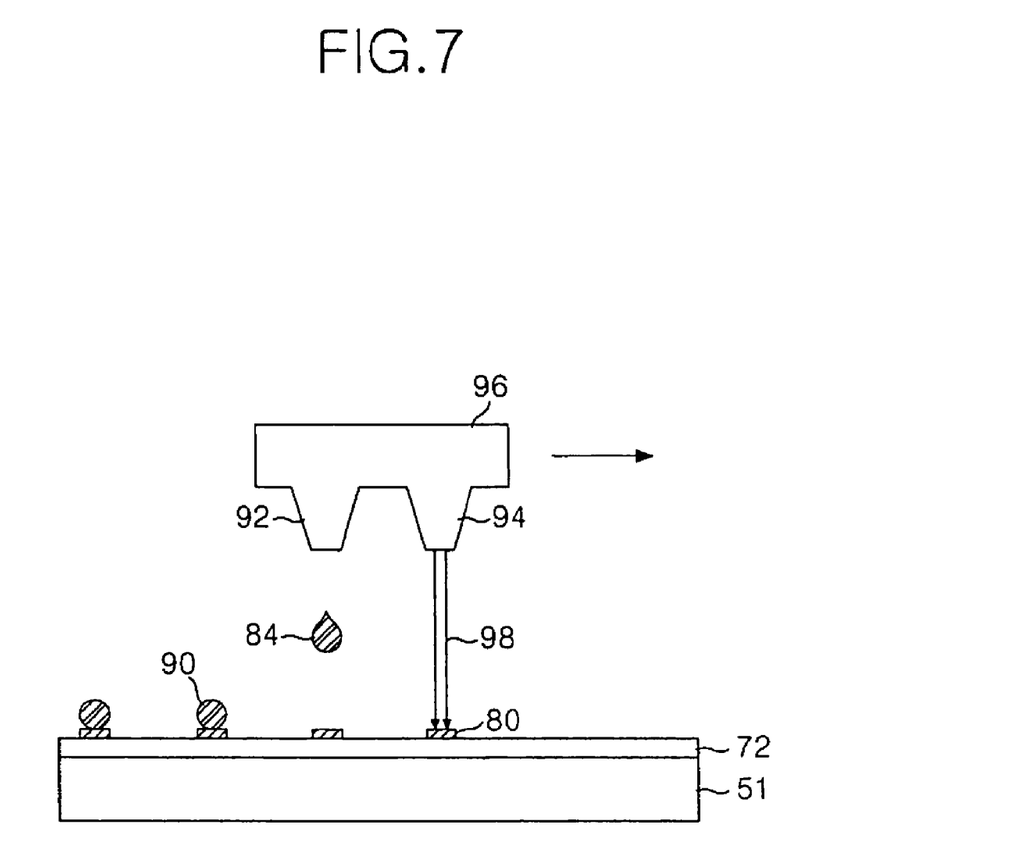
FIG. 7 is a sectional view showing a manufacturing apparatus for the liquid crystal display panel, which is an integration of the ink-jet jetting part and the laser irradiating part.

On the other hand, the ink-jet jetting part 86 and the laser source 76 respectively shown in FIGS. 6b and 6c may be incorporated in a single unit, such as the spacer maker 96 shown in FIG. 7. Namely, the spacer maker 96 includes an ink-jet jetting nozzle 92 and a laser irradiation nozzle 94. The laser irradiation nozzle 94 irradiates a laser beam 98 of short wavelength onto the hydrophobic region of the uppermost layer 72 so as to change the irradiated region into a hydrophilic region 80. Meanwhile, the ink-jet jetting nozzle 92 jets the spacer material 84 onto the hydrophilic region so as to form a spacer. The spacer maker 96 aligned above the substrate 51 is then moved to form the next spacer 90 on the hydrophobic region 80.

The laser source 76 in FIG. 6b, the ink-jet jetting part 86 in FIG. 6c can be combined like the ink-jet jetting nozzle 92 in FIG. 7 and laser irradiation nozzle 94 in FIG. 7 to have corresponding nozzles in a single unit, to thereby further shorten the process time. On the other hand, the liquid crystal display panel, the fabricating method thereof, and the fabricating apparatus thereof according to the present invention can be used to make the region that overlaps with the black matrix be hydrophobic and other region be hydrophilic, and form a spacer at the hydrophobic region by jetting hydrophobic spacer material to the hydrophobic region.

As mentioned above in detail, the liquid crystal display panel, the fabricating method thereof, and the fabricating apparatus thereof according to the present invention forms spacers using an ink-jet device. This reduces the number of mask processes and simplify the manufacturing process. Also, a liquid crystal display panel and a fabricating method thereof according to the present invention jet spacer material onto the substrate that is divided into hydrophilic and a hydrophobic regions. This leads to forming spacers of designated height on the hydrophilic regions, which overlap the black matrix. Thus, the spacers of a desired height can be formed at desired regions. Additionally, the integration of a ink-jet jetting part and a laser source can further shorten the manufacturing time.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel, comprising:
    a substrate;
    a black matrix disposed on the substrate;
    a color filter disposed in a cell region defined by the black matrix;
    a planarization layer directly contacting the black matrix and the color filter, the planarization layer comprising a first surface region and a plurality of second surface regions surrounded by the first surface region, the first and second surface regions comprising different surface characteristics in reaction to a particular liquid; and
    a spacer formed on the second surface region and overlapping with the second surface region,
    wherein the planarization layer comprises an organic insulating material,
    wherein the first surface region comprises a fluorine compound having a hydrophobic characteristic,
    wherein the second surface regions comprise a hydrophilic characteristic,
    wherein the second surface region has a width substantially identical to that of a top surface of the black matrix,
    wherein the spacer directly contacts the second surface region of the planarization layer, and
    wherein the second surface region is:
        transformed from the first surface region with a hydrophilic region, and overlapped with the black matrix.

2. The liquid crystal display panel according to claim 1, wherein the second surface region has a width in a range of about 10~70 microns (μm).

3. The liquid crystal display panel according to claim 1, wherein the spacer is formed using an inkjet method.

4. The liquid crystal display panel according to claim 1, wherein the second surface regions comprise a circular dot shape and are spaced apart from each other.

* * * * *